United States Patent [19]
Karimullah

[11] Patent Number: 5,343,493
[45] Date of Patent: Aug. 30, 1994

[54] PERSONAL ASSISTANCE SYSTEM AND METHOD FOR USE WITH A CELLULAR COMMUNICATION SYSTEM

[75] Inventor: Khalid Karimullah, San Diego, Calif.

[73] Assignee: Hughes Aircraft Company, Los Angeles, Calif.

[21] Appl. No.: 33,673

[22] Filed: Mar. 16, 1993

[51] Int. Cl.⁵ .................................................. H04L 27/30
[52] U.S. Cl. ....................................... 375/1; 380/34; 379/37; 379/39; 379/45; 379/58; 379/59; 455/33.1; 455/53.1; 455/54.1; 455/54.2
[58] Field of Search ............... 455/33.1, 53.1, 54.1, 455/54.2, 56.1; 379/58–60, 37, 39, 45, 49; 340/425.5; 370/18

[56] References Cited

U.S. PATENT DOCUMENTS

| | | | |
|---|---|---|---|
| 3,646,580 | 2/1972 | Fuller et al. ................ | 455/56.1 |
| 4,184,118 | 1/1980 | Cannalte et al. ............ | 455/54.2 X |
| 4,724,538 | 2/1988 | Farrell ........................ | 379/59 |
| 5,247,564 | 9/1993 | Zicker ........................ | 379/58 X |

Primary Examiner—Bernaar E. Gregory
Attorney, Agent, or Firm—William J. Streeter; Wanda K. Denson-Low

[57] ABSTRACT

A personal assistance system and method for use with a cellular communication system operating over a cellular communication band and having a plurality of cell-sites. A transceiver transmits to the cell-sites a spread spectrum burst of pulses including a service request codeword indicating a request for service from a service provider. A proxy cell-phone, coupled to a preferred one of the cell-sites, originates a cellular call on the cellular communication system to a destination number of the service provider and on behalf of the transceiver to thereby create a cellular communication link between the transceiver and the service provider. A transceiver location feature provides the service provider with the geographic location of the transceiver.

15 Claims, 5 Drawing Sheets

PERSONAL ASSISTANCE SYSTEM AND METHOD FOR USE WITH A CELLULAR COMMUNICATION SYSTEM

BACKGROUND OF THE INVENTION

Field of the Invention

The present invention relates to a personal assistance system and method and, more specifically, to a personal assistance system and method for use with a cellular communication system.

Description of the Related Art

Personal assistance systems, such as burglar or fire alarm systems, which transmit the triggering of an alarm at a stationary location, e.g., a home or business, to a remote central location for summoning aid are well known. Prior to CB/radio, security for vehicles or individuals involved reaching the nearest telephone and calling "911", a towing company, or the police department, depending on the type of assistance needed. Although CB radios are frequently used to summon assistance, a request at times either goes unheeded or brings unwanted or undesirable assistance. Further, the range of communication with such systems is limited.

With the advent of the cellular mobile telephone, a person needing emergency assistance could readily and directly communicate with a party able to provide the type of help required. However, if the cellular phone were of the analog type, the call for assistance may be overheard, which could possibly attract undesirable offers of assistance not requested. Also, at times, the individual requesting assistance does not know previously where he or she is located, thus making it difficult for him or her to be found. In addition, if the person needing assistance does not speak English, or is not capable of speaking at all, summoning aid can be almost impossible.

SUMMARY OF THE INVENTION

Accordingly, it is an object of the present invention to provide an improved personal assistance system.

It is another object of the present invention to provide a personal assistance system for use with a cellular communication system.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the foregoing object, and in accordance with the purposes of the invention as embodied and broadly described herein, a personal assistance system for use with a cellular communication system operating over a cellular communication band and having a plurality of cell-sites is provided, comprising: a transceiver, the transceiver including a transmitter for transmitting to the plurality of cell-sites a spread spectrum burst of pulses including a service request codeword indicating a request for service from a service provider, and a receiver for receiving a response from the service provider to the request for service, the response being transmitted by at least one of the plurality of cell-sites; a plurality of grid receiver modules, each of the grid receiver modules including a coupling for coupling the grid receiver module to a respective one of the plurality of cell-sites, and a proxy cell-phone for originating a cellular call on the cellular communication system to a destination number of the service provider and on behalf of the transceiver upon receipt of the destination number of the service provider; and a processing center coupled to the plurality of grid receiver modules for, in response to the request for service, informing the service provider of the request for service, designating one of the plurality of cell-sites as a preferred cell-site, and sending the destination number of the service provider to the proxy cell-phone of the preferred cell-site to cause the proxy cell-phone of the preferred cell-site to originate the cellular call and thereby create a cellular communication link between the transceiver and the service provider.

To further achieve the foregoing object, and in accordance with the purposes of the invention as embodied and broadly described herein a method of transmitting from a transceiver and to a service provider a request for service, and of receiving at the transceiver a response from the service provider to the request, is provided, the method comprising the steps of: transmitting from the transceiver a spread spectrum burst of pulses including a service request codeword indicating a request for service from the service provider; receiving the spread spectrum burst at a cellular communication system operating over a cellular communication band and having a plurality of cell-sites; informing the service provider of the request for service; designating one of the plurality of cell-sites as a preferred cell-site; sending the destination number of the service provider to the preferred cell-site; originating a cellular call from the preferred cell-site to the destination number of the service provider to thereby create a cellular communication link between the transceiver and the service provider; transmitting from the preferred cell-site a response from the service provider to the request for service; and receiving the response from the service provider.

Generally, the personal assistance system and method of the present invention enable a subscriber to the system to request assistance from a remote service provider, such as "AAA", "ADT", "911" the police, or Traffic MGMT (CALTRAN), and receive a response including instructions from the service provider to the request, using a transceiver. Further, the personal assistance system and method of the present invention incorporate a transceiver location feature which provides the service provider with the geographic location of the transceiver.

It is to be understood that both the foregoing general description and the following detailed description are exemplary and explanatory only and are not restrictive of the invention as claimed.

The accompanying drawings, which are incorporated in and constitute a part of the specification, illustrate one embodiment of the invention and, together with the general description given above and the detailed description given below, serve to explain the principles of the invention.

DESCRIPTION OF THE PREFERRED EMBODIMENT

Reference will now be made in detail to the presently preferred embodiment of the invention as illustrated in the accompanying drawings. Wherever possible, the same reference numbers will be used throughout the drawings to refer to the same or like parts.

Figure 1:
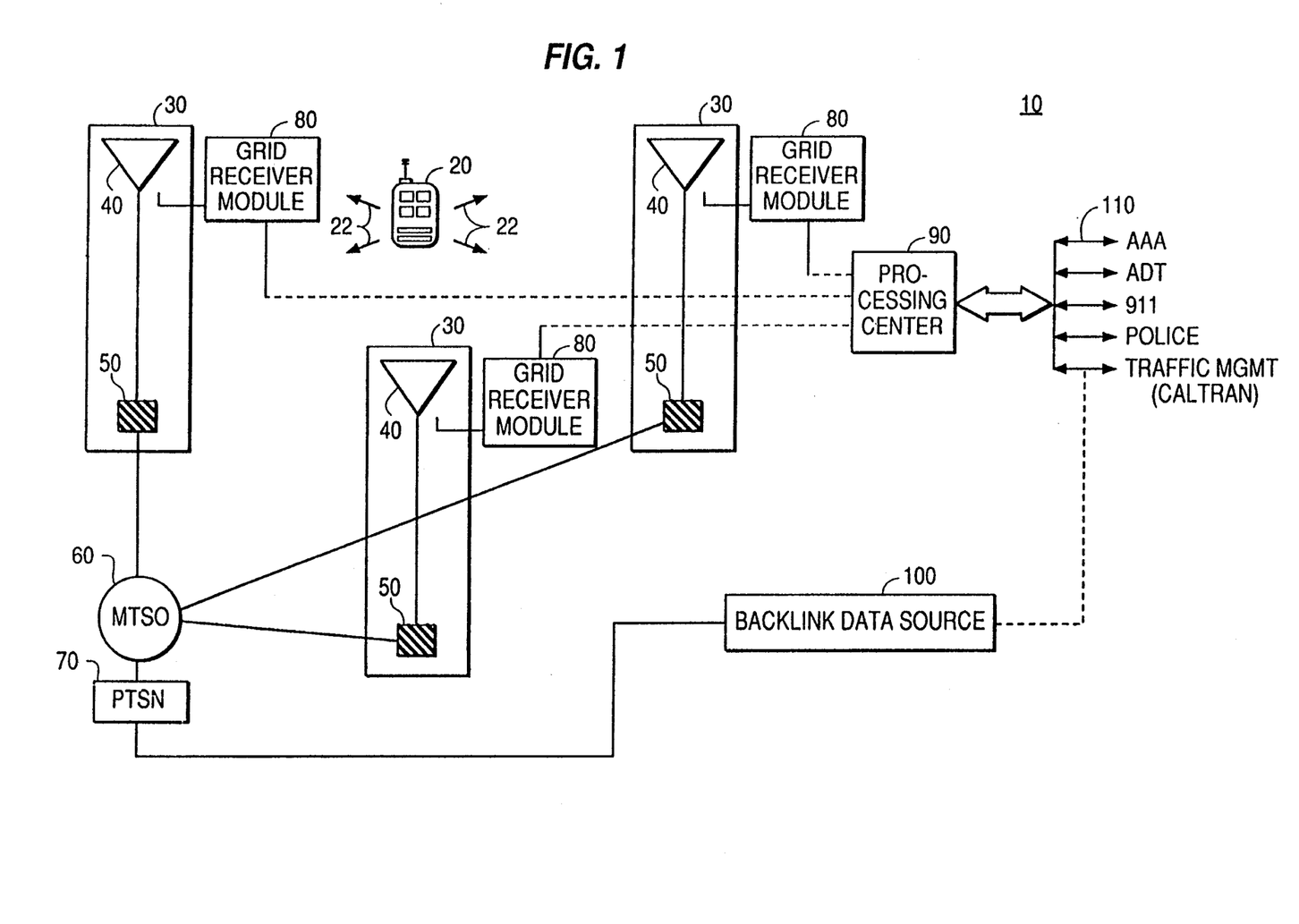
FIG. 1 is a block diagram of a personal assistance system incorporating the teachings of the present invention.

Referring to FIG. 1, personal assistance system 10 comprises a plurality of cell-sites 30, each of which includes an antenna 40 and cell-site equipment 50, a main telephone switching office (MTSO) 60, a public telephone switching network (PTSN) 70, a plurality of grid receiver modules 80, a processing center 90, a backlink data source (BDS) 100, and a plurality of service providers 110.

Preferably, all of the cell-sites 30, including their respective antennas 40 and cell-site equipment 50, are identical, as are all of the grid receiver modules 80. Further, the cell-sites 30, the MTSO 60, and the PTSN 70 are, preferably, part of an existing cellular communication system which operates over a cellular communication band. Thus, details of their construction and operation are known to those of ordinary skill in the art and descriptions thereof will be omitted.

The BDS 100 comprises, for example, one or more standard telephone line modems for converting data into the voice band, as is known to those of ordinary skill in the art. As will be explained in more detail below, the BDS 100 is used by the service providers 110 and/or the processing center 90 to send data messages and control messages, respectively, to the transceiver 20 via the PTSN 70, the MTSO 60, and at least one of the cell-sites 30. It should be understood that the BDS 100 can be incorporated within each of the grid receiver modules 80 or the processing center 90, or it can be an external, stand-alone unit situated, for example, at each of the service providers 110.

Figure 2:
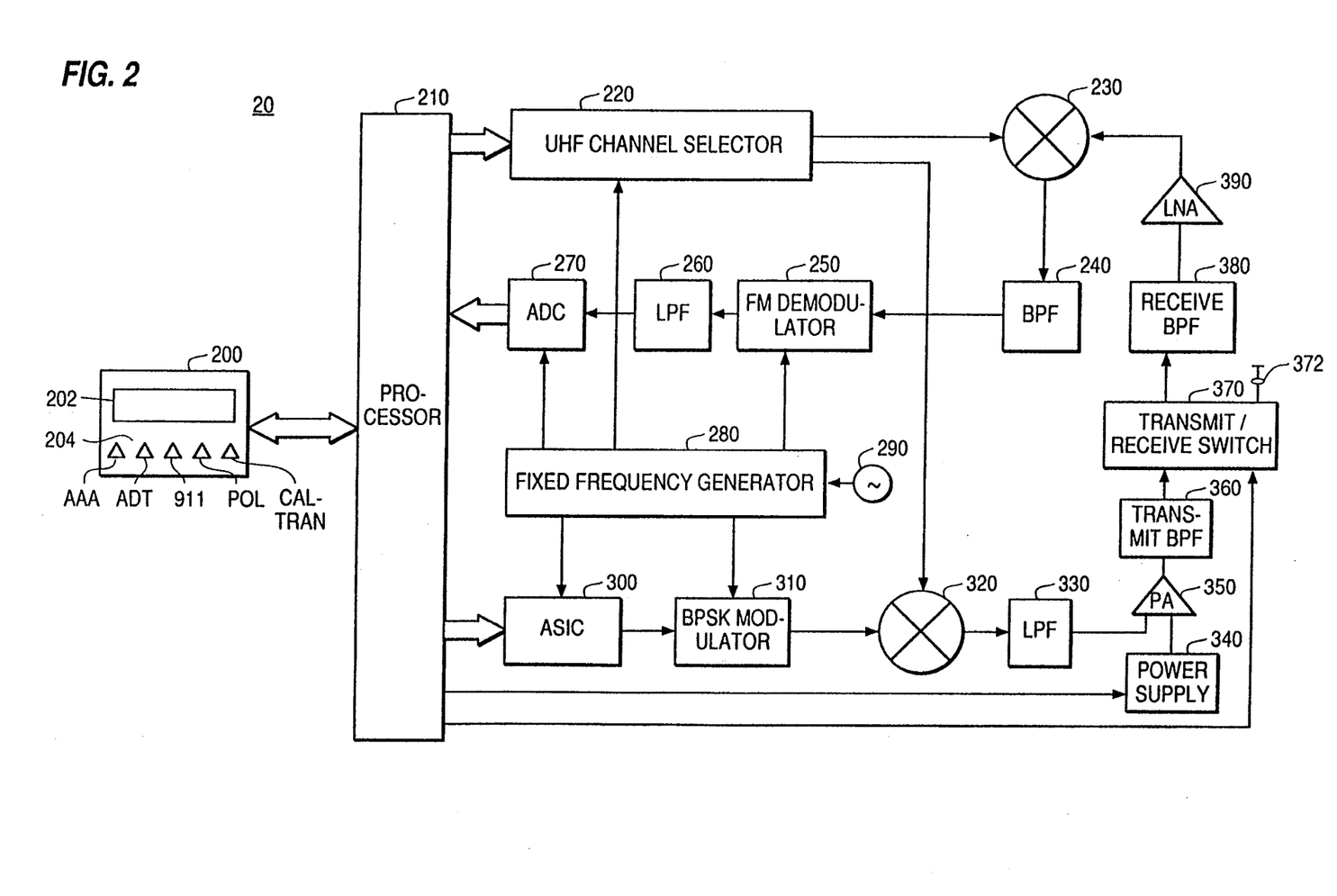
FIG. 2 is a block diagram of the transceiver of the personal assistance system of FIG. 1.

FIG. 2 is a block diagram of the transceiver 20 of the personal assistance system 10 of FIG. 1. As will be described in more detail below, transceiver 20 is capable of transmitting a spread spectrum burst of pulses and receiving information over cellular communication channels. As shown in FIG. 2, the transceiver 20 comprises a user interface 200, a processor 210, a UHF channel selector 220, a down-converter 230, a band-pass filter 240, an FM demodulator 250, a low-pass filter 260, an A/D converter 270, a fixed frequency generator 280, a master oscillator 290, an advanced silicon integrated circuit (ASIC) 300, a binary phase shift key (BPSK) modulator 310, an up-converter 320, a low-pass filter 330, a power supply 340, a low duty cycle power amplifier 350, a transmit band-pass filter 360, a transmit/receive switch 370, an antenna 372, a receive band-pass filter 380, and a low-noise amplifier 390. Preferably, the transceiver 20 is portable and powered by a battery (not shown).

As further shown in FIG. 2, the user interface 200 comprises, for example, a plurality of service request buttons 204 corresponding to each of the service providers 110, and an alphanumeric display 202 for displaying data messages, such as a response from one or more of the service providers 110 to a request for assistance received via its antenna 372.

To activate the transceiver 20, a user or subscriber to the personal assistance system 10 presses one of the service request buttons 204 corresponding to the particular service provider from which the subscriber desires service. For example, if the subscriber wishes to notify "911" of an emergency, the subscriber need only press the service request button corresponding to "911." It should be understood that the number of service providers, and thus the number of service request buttons 204, incorporated into the personal assistance system 10 can be varied depending on the subscriber's needs and/or cost constraints.

It should be noted that the transceiver 20 can also be activated in response to a control message transmitted by the processing center 90 and received by the transceiver 20 via its antenna 372. This feature of the present invention is particularly useful for remotely controlling the functions of the transceiver 20.

For example, if the processing center 90 determines that a spread spectrum burst transmitted by the transceiver is inadequate, the processing center 90 can send the transceiver 20 a control message instructing the transceiver 20 to re-transmit the burst using different parameters, e.g., reduced/enhanced power, change of center frequency, elongated preamble, repeat periodically, insert acknowledgment bits, etc.

Similarly, the processing center 90 can "page" the transceiver 20 to determine the location of the transceiver 20 or to initiate a test routine. For instance, assuming that the location of the transceiver 20 is unknown, the processing center 90 can send the transceiver 20 a control message instructing the transceiver 20 to transmit a spread spectrum burst having specific parameters. The transceiver 20 will then transmit the requested spread spectrum burst along with an acknowledgment of the "page." Such a transmission by the transceiver 20 will enable the processing center 90 to locate, test, or even track the transceiver 20, as will be described in more detail below.

Upon being activated, the transceiver 20 transmits a spread spectrum burst of pulses 22 (FIG. 1). The ASIC 300, BPSK modulator 310, up-converter 320, low-pass filter 330, power supply 340, low duty cycle power amplifier 350, transmit band-pass filter 360 serve as a transmit section of the transceiver 20 for transmitting, via the transmit/receive switch 370 and the antenna 372, the spread spectrum burst of pulses 22.

The spread spectrum burst 22 includes, nominally, a preamble, timing refinement overhead, and data. The data, preferably, includes, at a minimum, a service request codeword indicating a request for service from at least one of the service providers 110, a control channel codeword identifying a control channel of, preferably, the best positioned cell-site in the cellular communication band over which the cellular communication system incorporating the cell-sites 30 operates, and a transceiver identification codeword identifying the transceiver 20. The spread spectrum burst 22, preferably, has a relatively short duration, for example, less than 10 milliseconds, and occurs at rates below once per second. Thus, the transceiver 20 consumes very little power, leading to long battery life.

The receive band-pass filter 380, low-noise amplifier 390, down-converter 230, UHF channel selector 220, band-pass filter 240, FM demodulator 250, low-pass filter 260, and A/D converter 270 serve as a receive section of the transceiver 20 for receiving, via the transmit/receive switch 370 and the antenna 372, data transmitted by one or more of the cell-sites 30 (FIG. 2). As was briefly mentioned above and as will be explained in more detail below, this data can comprise, for example, data messages including a response from one or more of the service providers 110 to a request for service, and/or control messages including instructions from the processing center 90.

Frequency translation signals and other necessary reference/clock signals are derived from the master oscillator 290 and generated by the fixed frequency generator 280.

The processor 210 comprises, for example, a commercially available microprocessor and controls the basic operations of the transceiver 20. For example, the processor 210 responds to user prompts from the service request buttons 204 as well as data and control messages received by the antenna 372 to generate the spread spectrum burst 22. Further, the processor 210 controls the display of the data messages on the alphanumeric display 202. Still further, the processor 210 scans, demodulates and decodes the control channels of the cellular communication band used by the cellular communication system incorporating the cell-sites 30, receives traffic channel assignments over the control channels, and, in response to a traffic channel assignment, tunes to an assigned traffic channel of the cellular communication band.

For example, once the spread spectrum burst 22 is transmitted, the processor 210 tunes to a selected one of the control channels of the cellular communication band, and awaits a traffic channel assignment. Preferably, the selection of a control channel by the processor 210 is based upon received signal strength estimates of each of the control channels of the cellular communication band, as well as parameters specific to the cellular communication system. It should be noted that the selected control channel is, preferably, identified by the control channel codeword included in the spread spectrum burst 22 as described above. It should also be noted that, preferably, the selected control channel belongs to the preferred cell-site.

Once tuned to a traffic channel the processor 210 can route the received data message to the alphanumeric display 202 for displaying acknowledgments, directions, a phone number, etc. Preferably, if a specified period of time has elapsed and the traffic channel assignment has not been received, the processor 210 will initiate a retransmission of the spread spectrum pulse 22 and possibly re-scan the control channels. Further, the processor 210 is, preferably, always in a receive mode except when activated as described above.

It should be appreciated that, to reduce weight and cost, the transceiver 20, preferably, has very limited transmission capabilities, i.e., it cannot transpond supervisory audio tone or transmit supervisory tone. Further, the lack of a diplexer, the transceiver 20, instead, utilizes the transmit/receive switch 370, power amplifier for continuous operation, power level control circuitry, preferably, course levels, e.g., four steps, are set in the BPSK modulator 310, and general compliance with cellular transmission standards allows the transceiver 20 to be small, power efficient, and low in cost. It should be appreciated that removal of these features makes the transceiver 20 significantly different from a standard analog telephone.

Figure 3:
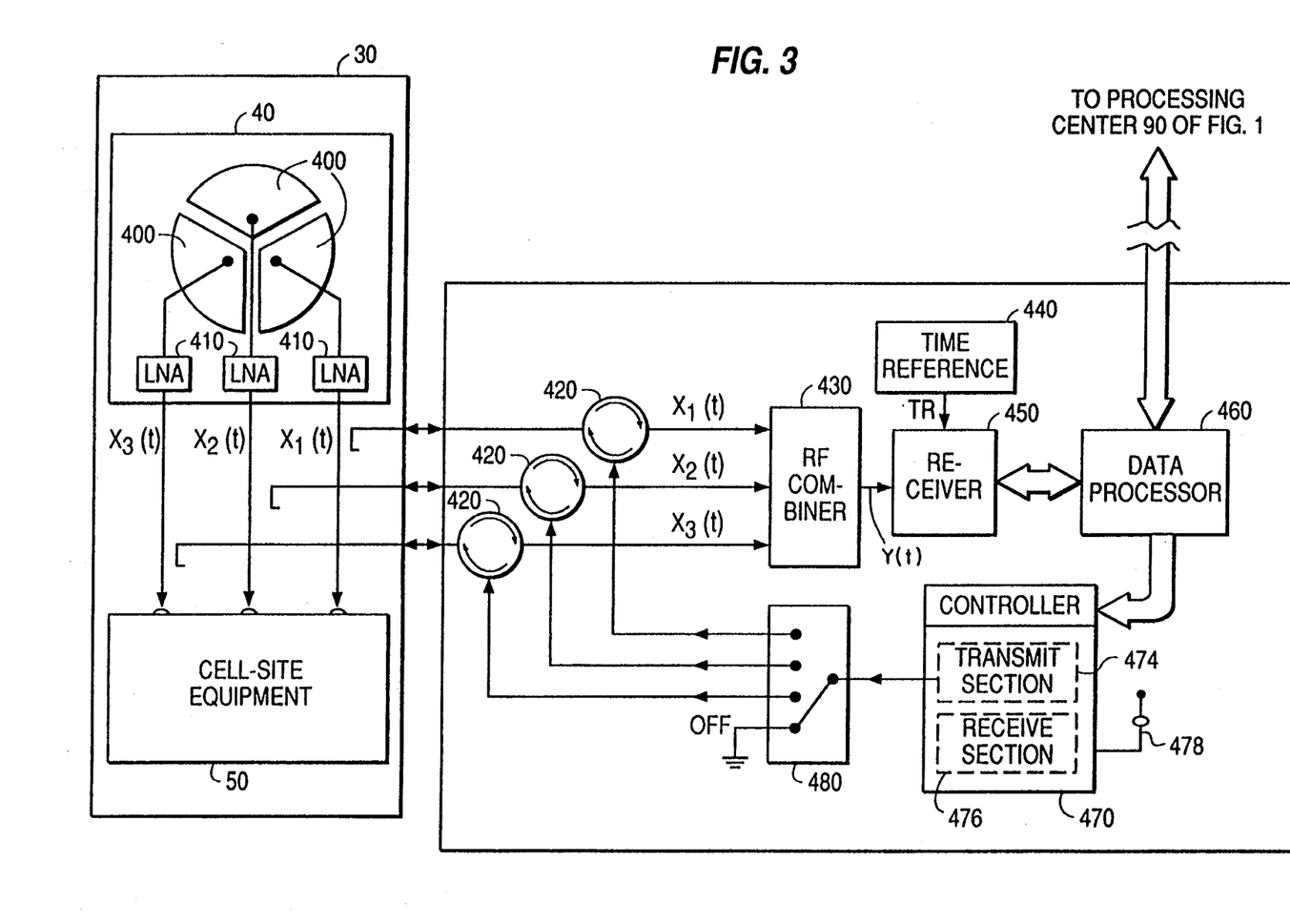
FIG. 3 is a block diagram of a cell-site and a grid receiver module of the personal assistance system of FIG. 1.

FIG. 3 is a block diagram of one of the cell-sites 30 and one of the grid receiver modules 80 of FIG. 2. As explained above, each of the cell-sites 30 and each of the grid receiver modules 80 of FIG. 1 is, preferably, identical. Accordingly, the cell-sites 30 and grid receiver modules 80 of FIG. 1 will be described with respect to the single cell-site 30 and grid receiver module 80 of FIG. 3. Essentially, the cell-site 30 serves to receive the spread spectrum pulse 22 transmitted by the transceiver 20 and transmit data and control messages to the transceiver 20 and grid receiver module 80 along cellular communication channels.

As shown in FIG. 3, the cell-site 30 comprises an antenna 40 and cell-site equipment 50. The antenna 40 comprises three 120° antenna sectors 400 and corresponding low-noise amplifiers 410. Accordingly, the spread spectrum burst 22 received by the antenna 40 is separated into three component signals $X_1(t)$, $X_2(t)$, and $X_3(t)$. The low-noise amplifiers 410 are coupled to the cell-site equipment 50 which includes down-converters, etc. As described above, the construction and operation of the antenna 40 and the cell-site equipment 50 are known to those of ordinary skill in the art and more detailed descriptions thereof will be omitted.

As also shown in FIG. 3, the grid receiver module 80 comprises a plurality of circulators 420, one corresponding to each of the antenna sectors 400, an RF combiner 430, a time reference 440, a receiver 450, a data processor 460, a proxy cell-phone 470 having a controller 472, a transmit section 474, a receive section 470 and an antenna 478, and an RF switch 480.

The circulators 420, in conjunction with UHF couplers (not shown), serve to couple the grid receiver module 80 to the cell-site 30. In addition, the circulators 420 provide sector-to-sector isolation between the antenna sectors 400 when the proxy cell-phone 470 transmits signals such that only a selected one of the antenna sectors 400 is injected with RF energy. Also, taking advantage of reverse coupling selectivity, the circulators 420 can be used to inject low level signals from the proxy cell-phone 470 back into the receive chain of the grid receiver module 80.

The combiner 430 comprises, for example, circuitry for receiving the output signals $X_1(t)$ through $X_3(t)$ from the circulators 400 and combining them into a single signal $Y(t)$. It should be appreciated that use of the combiner 430 eliminates the need for having three separate receivers.

The receiver 450 comprises, for example, a spread spectrum demodulator for demodulating the signal $Y(t)$. More specifically, the receiver 450 extracts from the signal $Y(t)$ the service request codeword, control channel codeword, and transceiver identification codeword which, as explained above, are included in the spread spectrum burst 22. Preferably, the receiver 450 also comprises circuitry for determining a time of arrival of the spread spectrum burst 22 at the cell-site 30 with reference to a time reference signal TR generated by the time reference 440. Preferably, each time reference of each of the grid receiver modules 80 of FIG. 1 is synched to a master time reference such as Global Positioning Satellite System (GPS).

The data processor 460 comprises, for example, a commercially available CPU, memory, and control logic for controlling the operation of the grid receiver module 80, and is preferably linked to the processing center 90 via a dedicated data link such as a microwave link, land trunk, or any other type of communication link capable of providing two-way communication between the processing center 90 and the grid receiver module 80. More specifically, the data processor 460 transmits to the processing center 90 the service request codeword, control channel codeword, and transceiver identification codeword extracted by the receiver 450. The data processor 460 also transmits to the processing center 90 the time of arrival measurement made by the receiver 450. Still further, upon receipt of a destination number, transceiver identification codeword, control channel codeword, and a sector identification codeword from the processing center 90, the data processor 460 enables the proxy cell-phone 470 to originate a cellular call to the destination number, as will be explained in more detail below.

The proxy cell-phone 470 comprises a controller 472, a transmit section 474, a receive section 476, and an antenna 478. It should be understood that the proxy cell-phone 470 is, in essence, a modified analog cellular telephone capable of originating cellular telephone calls from the cell-site 30 and receiving information via its antenna 478. The controller 472 controls the functions of the proxy cell-phone 470 and is, preferably, slaved to data processor 460.

Upon being enabled by the data processor 460, the controller 472 commands the transmit section 474 to originate a cellular call to the destination number supplied by the processing center 90 on behalf of the transceiver 20. Preferably, the call is originated on the control channel identified by the control channel codeword supplied by the processing center 90. Further, it is preferable that the cellular call is "guided" (in an RF sense) to the cell-site equipment 50 and MTSO 60 via a designated RF path. More specifically, the controller 472 uses the sector identification codeword supplied by the processing center 90 to operate the RF switch 480 to couple the output of the proxy cell-phone 470 to the particular one of the circulators 420 identified by the sector identification codeword so that the proxy cell-phone's access on behalf of the transceiver 20 is recognized by the MTSO 60. It is also preferable that the output power of the proxy cell-phone 470 be tailored to the selectivity of the circulators 420 via, for example, a power amplifier that meets EIA553 standards (not shown). Finally, after a specific duration or upon request from the processing center 90, a nominal call termination task can be performed by the proxy cell-phone 470, thereby terminating the cellular call.

Referring back to FIG. 1, the processing center 90 comprises, for example, circuitry including a processor and memory. As described above, the processing center 90 preferably communicates with the grid receiver modules 80 via a dedicated data link comprising, for example, a microwave link, land trunk, or any other type of communication link capable of providing two-way communication between the processing center 90 and the grid receiver modules 80. Further, the processing center 90 preferably communicates with each of the service providers 110 via, for example, a telephone line.

Upon receipt of the time of arrival measurements from each of the grid receiver modules 30, the processing center 90 computes the location of the transceiver. For example, assuming that the personal assistance system 10 comprises at least three cell-sites, the processing center 90 can use any known triangulation technique to determine the location of the transceiver 20 from the time of arrival measurements.

Upon receipt of the transceiver identification codeword, control channel codeword, and service request codeword from each of the cell-sites 30, the processing center 90 informs the service provider identified by the service request codeword of the nature of the request for service as well as the location of the transceiver 20. From the control channel codeword and the location of the transceiver 20, the processing center 90 also determines which one of the cell-sites 30 and, more precisely, which sector of that cell-site, is optimally located to communicate back with the transceiver 20. It should be noted that this cell-site and sector are termed the "preferred" cell-site and sector, respectively, and are identified by a sector identification codeword generated by the processing center 90, as was mentioned above. It should also be noted that, preferably, the preferred cell-site contains the control channel designated by the control channel codeword.

Finally, the processing center 90 determines the destination number of the service provider identified by the service request codeword and sends the transceiver identification codeword, the control channel codeword, the sector identification codeword, and the destination number to the grid receiver module coupled to the preferred cell-site. It should be noted that the destination number is essentially the telephone number of the BDS 100 used by the requested service provider and can be, for example, supplied to the processing center 90 by the service provider or pre-arranged. As discussed above, upon receipt of this information, the proxy cell-phone of the preferred cell-site is enabled and originates a cellular call to the destination number on behalf of the transceiver 20.

It should be noted that, in the event that the time of arrival measurements made by the grid receiver modules 80 are not determined with sufficient certainty for the processing center 90 to determine the location of the transceiver 20, at least the service request codeword, control channel codeword, identification codeword, and preferred cell-site are known. In such a case, the processing center 90 can utilize various options. For example, the processing center 90 can immediately activate the BDS 100 and, once a traffic channel connection is made, as described above, instruct the transceiver 20 to re-transmit the spread spectrum burst 22. Similarly, the processing center 90 can "page" the transceiver 20 on a forward control channel, as described above, in which case the MTSO 60 will simply call the transceiver 20 after a specific interval to enable the transceiver 20 to tune back to a traffic channel.

Figure 4A:
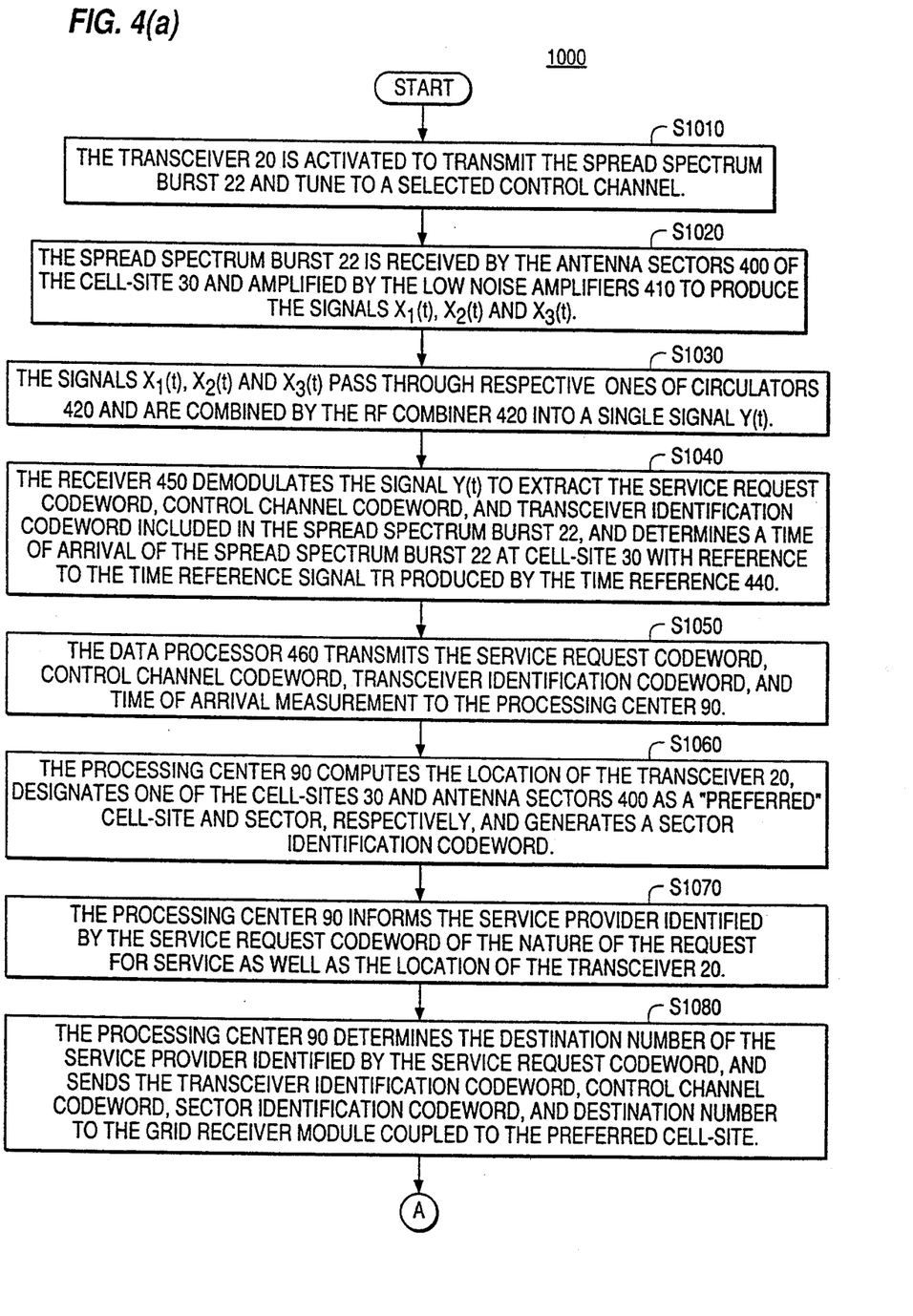
FIGS. 4(a) and 4(b) illustrate an operation sequence of the various components of the personal assistance system of FIGS. 1-3.
Figure 4B:
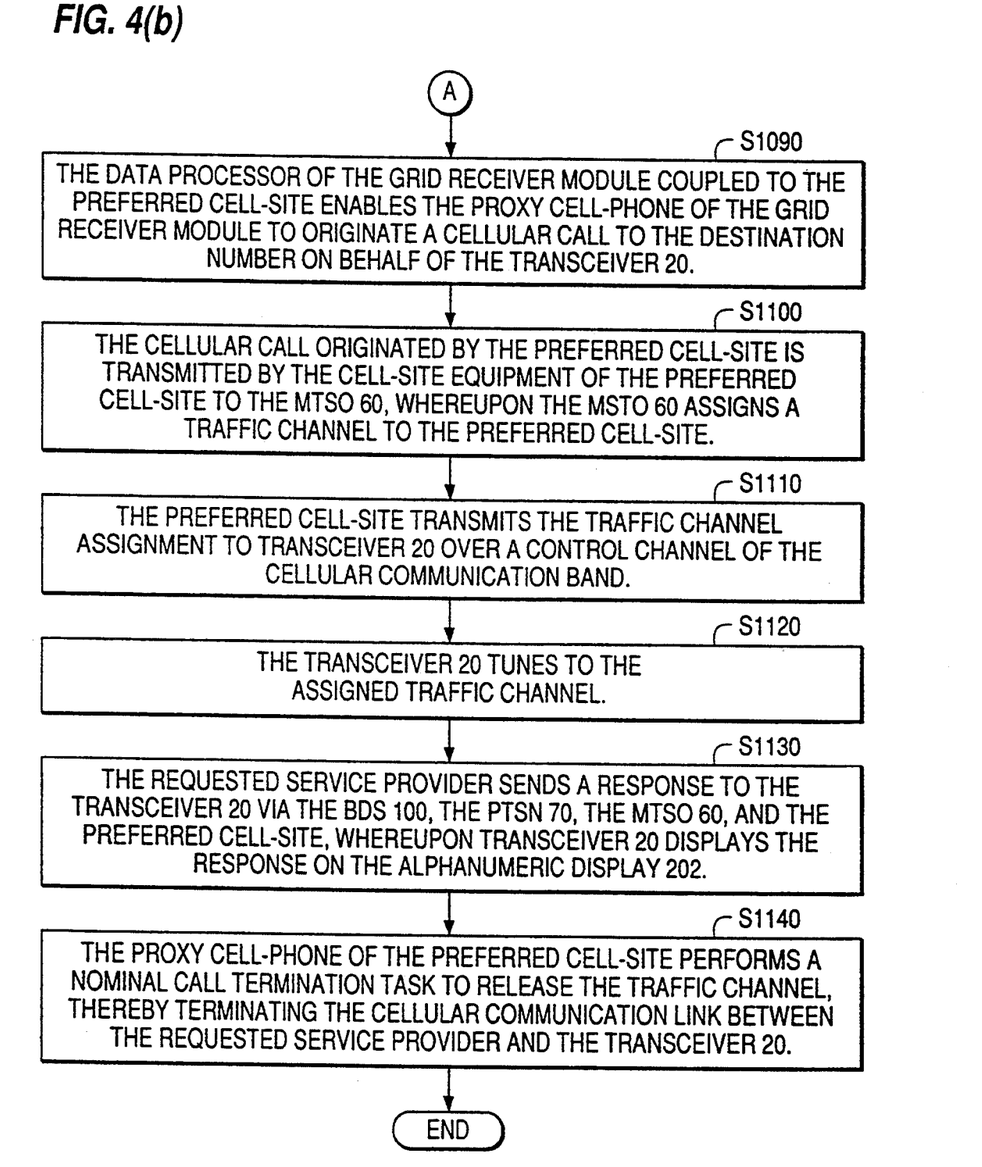

Operation of personal assistance system 10 will not be described in detail with reference to the block diagrams of FIGS. 1–3 by way of the operation sequence 1000 of FIGS. 4(a) and 4(b).

Referring to block S1010, transceiver 20 is activated to transmit the spread spectrum burst 22 and tune to a selected control channel.

As explained above, preferably, the cell-sites 30 are identical as are the grid receiver modules 80. Accordingly, the functions outlined in blocks S1020 through S1050 will be described with respect to the single cell-site 30 and grid receiver module 80 illustrated in FIG. 3. It should be understood, however, that the functions outlined in blocks S1020 through S1050 are performed by each of the cell-sites 30 and grid receiver modules 80 of FIG. 1.

Referring to block S1020, the spread spectrum burst 22 is received by the antenna sectors 400 of the cell-site 30 and amplified by the low noise amplifiers 410 to produce the signals $X_1(t)$, $X_2(t)$ and $X_3(t)$.

Referring to block S1030, the signals $X_1(t)$, $X_2(t)$ and $X_3(t)$ pass through respective ones of circulators 420 and are combined by the RF combiner 420 into a single signal $Y(t)$.

Referring to block S1040, the receiver 450 demodulates the signal $Y(t)$ to extract the service request codeword, control channel codeword, and transceiver identification codeword included in the spread spectrum burst 22, and determines a time of arrival of the spread spectrum burst 22 at cell-site 30 with reference to the time reference signal TR produced by the time reference 440.

Referring to block S1050, the data processor 460 transmits the service request codeword, control channel codeword, transceiver identification codeword, and time of arrival measurement to the processing center 90.

Referring to block S1060, upon receipt of the service request codeword, control channel codeword, transceiver identification codeword, and time of arrival measurements from each of the grid receiver modules 80, the processing center 90 computes the location of the transceiver 20, designates one of the cell-sites 30 and antenna sectors 400 as a "preferred" cell-site and sector, respectively, and generates a sector identification codeword. As described above, the "preferred" cell-site and sector are identified by the sector identification codeword generated by the processing center 90.

Referring to block S1070, the processing center 90 informs the service provider identified by the service request codeword of the nature of the request for service as well as the location of the transceiver 20.

Referring to block S1080, the processing center 90 determines the destination number of the service provider identified by the service request codeword, and sends the transceiver identification codeword, control channel codeword, sector identification codeword, and destination number to the grid receiver module coupled to the preferred cell-site.

Referring to block S1090, upon receipt of the transceiver identification codeword, control channel codeword, sector identification codeword, and destination number, the data processor of the grid receiver module coupled to the preferred cell-site enables the proxy cell-phone of the grid receiver module to originate a cellular call to the destination number on behalf of the transceiver 20.

Referring to block S1100, the cellular call originated by the preferred cell-site is transmitted by the cell-site equipment of the preferred cell-site to the MTSO 60, whereupon the MTSO 60 assigns a traffic channel to the preferred cell-site.

Referring to block S1110, upon receipt of the traffic channel assignment, the preferred cell-site transmits the traffic channel assignment to transceiver 20 over a control channel of the cellular communication band. As described above, the proxy cell-phone of the preferred cell-site also receives the traffic channel assignment via its antenna.

Referring to block S1120, upon receipt of the traffic channel assignment from the preferred cell-site, the transceiver 20 tunes to the assigned traffic channel.

Referring to block S1130, the requested service provider sends a response to the transceiver 20 via the BDS 100, the PTSN 70, the MTSO 60, and the preferred cell-site, whereupon transceiver 20 displays the response on the alphanumeric display 202.

Referring to block S1140, after a specified duration or upon request by the processing unit 90, the proxy cell-phone of the preferred cell-site performs a nominal call termination task to release the traffic channel, thereby terminating the cellular communication link between the requested service provider and the transceiver 20.

It should be evident from the foregoing description of the preferred embodiment of the present invention that the present invention provides for many benefits over conventional systems. For example, because the transceiver 20 has limited transmission capabilities, it can be low-cost and portable. Further, the present invention avoids the need for nonstandard Cellular assistance for backlink data transfer. Other than coupling into the RF receive chain of existing cell-sites, no modification is required to the standard cellular cell-site equipment or the MTSO-to-cell-site control protocol. As seen by the MTSO 60, the transceiver 20 is just like any other cellular phone. Still further, call origination by the proxy cell-phone is a low-overhead process for frequency assignment. Finally, alternatives to the present invention are costly or involve the use of control channels or dedicated traffic channels for backlink data transfer. Paging, for example, is another option outside the cellular band, but this requires entering into the queue of a heavily used service at all times and significant delay to acknowledge, or to initiate a "re-transmit" or "help is on the way" message.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A personal assistance system for use with a cellular communication system operating over a cellular communication band and having a plurality of cell-sites, said personal assistance system comprising:

a transceiver, said transceiver including
transmitting means for transmitting to said plurality of cell-sites a spread spectrum burst of pulses including a service request codeword indicating a request for service from a service provider, and
receiving means for receiving a response from said service provider to said request for service, said response being transmitted by at least one of said plurality of cell-sites;

a plurality of grid receiver modules, each of said grid receiver modules including
coupling means for coupling said grid receiver module to a respective one of said plurality of cell-sites, and
proxy cell-phone means for originating a cellular call on said cellular communication system to a destination number of said service provider and on behalf of said transceiver upon receipt of said destination number of said service provider; and processing center means coupled to said plurality of grid receiver modules for, in response to said request for service, informing said service provider of said request for service, designating one of said plurality of cell-sites as a preferred cell-site, and sending said destination number of said service provider to said proxy cell-phone means of said preferred cell-site to cause said proxy cell-phone means of said preferred cell-site to originate said cellular call and thereby create a cellular communication link between said transceiver means and said service provider.

2. The personal assistance system of claim 1, wherein said spread spectrum burst further includes a control channel codeword identifying a control channel of said cellular communication band, and said transceiver further includes
control channel tuning means for tuning to said control channel to receive a traffic channel assignment from said cellular communication system, said traffic channel assignment identifying a traffic channel of said cellular communication band, and traffic channel tuning means for, in response to said traffic channel assignment, tuning to said traffic channel to receive said response from said service provider.

3. The personal assistance system of claim 2, wherein said proxy cell-phone means of each of said grid receiver modules originates said cellular call to said destination number of said service provider on said control channel identified by said control channel codeword.

4. The personal assistance system of claim 1, wherein said processing center means designates one of said plurality of cell-sites as a preferred cell-site by determining which one of said plurality of cell-sites is optimally located to communicate with said transceiver.

5. The personal assistance system of claim 1, wherein each of said plurality of grid receiver modules further includes time of arrival determining means for determining a time of arrival of said spread spectrum burst at said respective cell-site coupled to said grid receiver module, and said processing center means includes transceiver location determining means for determining a geographic location of said transceiver from said times of arrival determined by said grid receiver modules and for informing said service provider of said geographic location.

6. The personal assistance system of claim 1, wherein said transceiver is portable and powered by a battery.

7. The personal assistance system of claim 1, wherein said spread spectrum burst further includes a transceiver identification codeword identifying said transceiver.

8. The personal assistance system of claim 1, wherein said transceiver further includes display means for displaying said response from said service provider.

9. A method of transmitting from a transceiver and to a service provider a request for service, and of receiving at the transceiver a response from the service provider to the request, the method comprising the steps of:
transmitting from the transceiver a spread spectrum burst of pulses including a service request codeword indicating a request for service from the service provider;

receiving said spread spectrum burst at a cellular communication system operating over a cellular communication band and having a plurality of cell-sites;

informing the service provider of said request for service;

designating one of said plurality of cell-sites as a preferred cell-site;

sending said destination number of the service provider to said preferred cell-site;

originating a cellular call from said preferred cell-site to said destination number of the service provider to thereby create a cellular communication link between the transceiver and the service provider;

transmitting from said preferred cell-site a response from the service provider to said request for service; and receiving said response from the service provider.

10. The method of claim 9, wherein
the step of transmitting said spread spectrum burst of pulses includes the step of transmitting a control channel codeword identifying a control channel of said cellular communication band, and the step of receiving said response from the service provider includes the steps of
tuning to said control channel to receive a traffic channel assignment from said cellular communication system, said traffic channel assignment identifying a traffic channel of said cellular communication band, and tuning to said traffic channel to receive said response from the service provider.

11. The method of claim 10, wherein the step of originating said cellular call from said preferred cell-site includes the step of originating said cellular call from said preferred cell-site on said control channel identified by said control channel codeword.

12. The method of claim 9, wherein the step of designating one of said plurality of cell-sites as said preferred cell-site includes the step of determining which one of said plurality of cell-sites is optimally located to communicate with the transceiver.

13. The method of claim 9, further comprising the steps of:
determining a time of arrival of said spread spectrum burst at each of said plurality of cell-sites;

determining a geographic location of the transceiver from said times of arrival; and informing the service provider of said geographic location.

14. The method of claim 9, wherein the step of transmitting said spread spectrum burst includes the step of transmitting a transceiver identification codeword identifying the transceiver.

15. The method of claim 9, wherein the step of receiving said response from the service provider includes the step of displaying said response from the service provider.

* * * * *